(12) United States Patent
Charpentier et al.

(10) Patent No.: US 7,243,941 B2
(45) Date of Patent: Jul. 17, 2007

(54) AIR-BAG

(75) Inventors: Frédéric Charpentier, Le Vauroux (FR); David Stow, Gothenburg (SE); Altay Kismir, Tilbury (CA); David L. Dominissini, Allen Park, MI (US); Jamie Rawlings, Leamington (CA)

(73) Assignee: Autoliv Development AB, Vargarda (SE)

( * ) Notice: Subject to any disclaimer, the term of this patent is extended or adjusted under 35 U.S.C. 154(b) by 263 days.

(21) Appl. No.: 10/487,572

(22) PCT Filed: Aug. 6, 2002

(86) PCT No.: PCT/SE02/01426

§ 371 (c)(1), (2), (4) Date: Aug. 16, 2004

(87) PCT Pub. No.: WO03/018372

PCT Pub. Date: Mar. 6, 2003

(65) Prior Publication Data

US 2005/0001415 A1    Jan. 6, 2005

(30) Foreign Application Priority Data

Aug. 22, 2001 (GB) .................................. 0120420.5

(51) Int. Cl.
*B60R 21/16* (2006.01)

(52) U.S. Cl. ..................... 280/729; 280/730.2; 280/742
(58) Field of Classification Search ................ 280/729, 280/740, 742, 730.2, 741
See application file for complete search history.

(56) References Cited

U.S. PATENT DOCUMENTS 6,530,595 B2 *   3/2003   Masuda et al.  ........... 280/730.2
6,962,364 B2 *  11/2005   Ju et al.  .................. 280/730.2

FOREIGN PATENT DOCUMENTS

| GB | 2 314 300 | 12/1997 |
| GB | 2 357 467 | 6/2001 |
| JP | 110321536 A | 11/1999 |
| WO | WO 99/42333 | 8/1999 |
| WO | WO 03/018372 | 3/2003 |

* cited by examiner

*Primary Examiner*—Paul N. Dickson
*Assistant Examiner*—Drew J. Brown
(74) *Attorney, Agent, or Firm*—Brinks Hofer Gilson & Lione

(57) ABSTRACT

An air-bag has a primary gas flow duct leading from a gas generator to one or more zones within the air-bag which are to be inflated. The air-bag has a separate inner gas flow duct mounted within the outer gas flow duct. The inner gas flow duct and the outer gas flow duct have areas thereof secured together in the region that is to be connected to the gas generator.

7 Claims, 4 Drawing Sheets

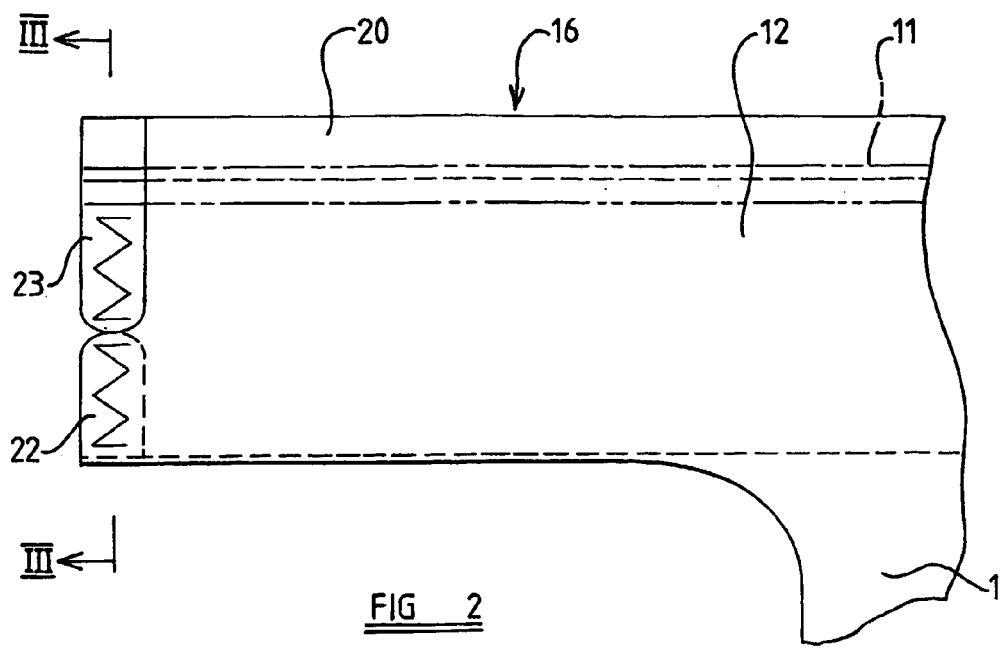
FIG 2
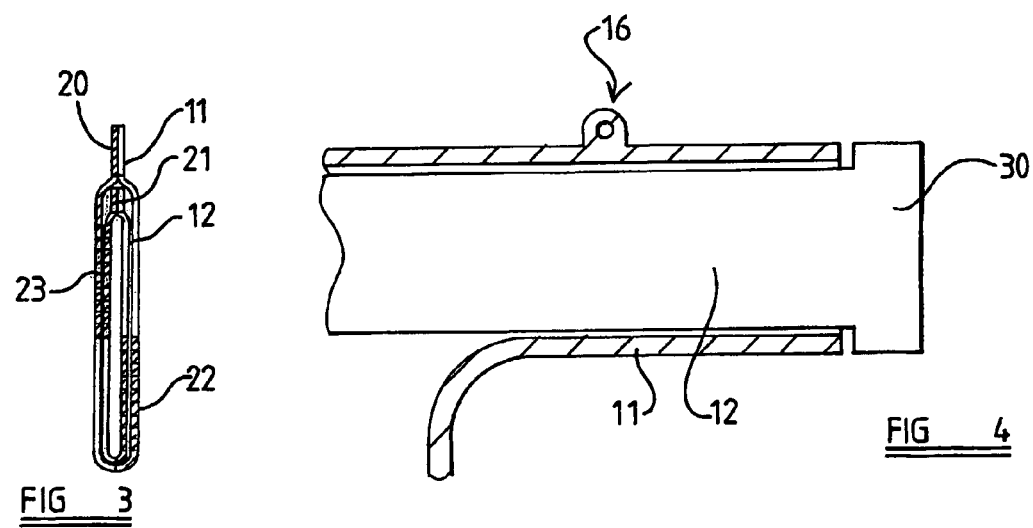
FIG 3
FIG 4
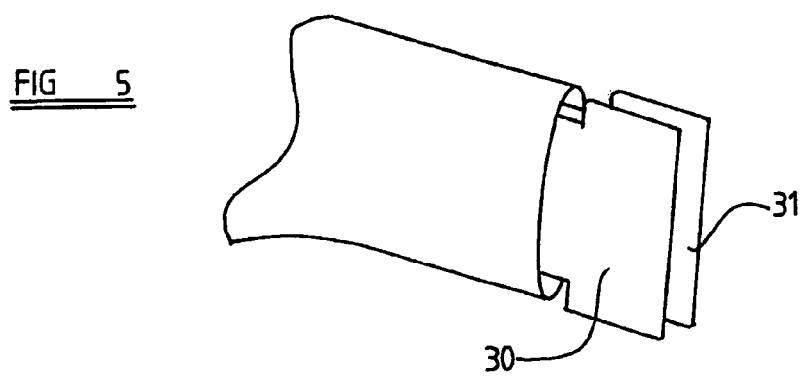
FIG 5

AIR-BAG

BACKGROUND OF THE INVENTION

THE PRESENT INVENTION relates to an air-bag, and more particularly relates to an air-bag in the form of a so-called inflatable curtain.

It has been proposed to provide an air-bag in the form of a so-called "inflatable curtain" which is initially mounted in the roof of a vehicle and which, when inflated, extends adjacent the side windows of a motor vehicle.

Such inflatable curtains have to be inflated within a very short period of time, and consequently the inflator or gas generator that is associated with such an inflatable curtain is adapted to generate a substantial volume of gas in a very short period of time. The gas entering the air-bag, on deployment thereof, thus has very aggressive flow.

In order to minimise the risk of damage occurring to the fabric of the air-bag, it has been proposed to provide an air-bag of this type with an inner filling sleeve. An air-bag of this type is disclosed in GB-2357467A.

The inner sleeve is coaxial with the main gas flow duct, and it is, of course, important that gas is introduced to the air-bag through the inner sleeve. If, for example, a gas generator is connected to the inflatable curtain in such a way that gas is injected into the space between the inner sleeve and the ordinary gas flow duct, the ordinary gas flow duct will almost certainly be damaged by the aggressive flow of gas from the gas generator or inflator.

The present invention seeks to provide an improved air-bag in which the risk of mis-connecting the gas generator to the air-bag is minimised or obviated.

According to this invention there is provided an air-bag, the air-bag having a primary gas flow duct to lead from a gas generator to one or more zones within the air-bag to be inflated, and a separate inner gas flow duct mounted within the outer gas flow duct, the inner gas flow duct, and the outer gas flow duct, in the region to be connected to a gas generator, having areas thereof secured together.

In one embodiment two areas of the inner gas flow duct are secured to two respective areas of the outer gas flow duct.

Conveniently the outer gas flow duct is formed from two superimposed layers of fabric, and the inner gas flow duct is formed from two superimposed layers of fabric, the upper layer of fabric forming the outer gas flow duct being secured to an area of the upper layer of fabric forming the inner gas flow duct, and the lower layer of fabric of the outer gas flow duct being secured to an area of the lower layer of fabric of the inner gas flow duct.

Advantageously the said two areas are off-set and not superimposed.

In another embodiment the inner gas flow duct is provided with projecting ears which extend beyond the end of the outer gas flow duct, and which are folded back about a fold-line to lie adjacent the end of the outer gas flow duct, the ears being secured to the fabric forming the outer gas flow duct.

In one version of this embodiment each ear has a dimension which is no greater than the diameter, when flat, of the inner gas flow duct, each ear being folded back to lie adjacent a respective layer of fabric forming the outer gas flow duct, each ear being secured to the layer of fabric that it lies adjacent.

In a further version of this embodiment each ear has a dimension greater than the diameter of the inner gas flow duct when flat, the ears being folded back to lie adjacent the exterior of the outer gas flow duct, with parts of the ears not lying over the inner gas flow duct, the parts of the ears not lying over the inner gas flow duct being secured together, and being secured to the fabric forming the outer gas flow duct.

Preferably at least one said fold-line of a projecting ear is provided with a slot and the air-bag is provided with a tab located to pass through the slot. The tab on the air-bag may pass through the slot and prevent the inner gas flow duct from being over-inserted into the air-bag.

Preferably at least one ear is provided with an aperture, and the outer gas flow duct and the inner gas flow duct are also provided with apertures so that the apertures in the or each ear is aligned with co-operating apertures in the outer gas flow duct and the inner gas flow duct. Conveniently each ear is provided with an aperture, and the outer and inner gas flow ducts are each provided with two apertures.

Conveniently the inner gas flow duct is provided with at least one further aperture at a point spaced from the projecting ears.

Advantageously the said areas are on axially extending tabs which project axially beyond the ends of the inner and outer gas flow ducts.

In order that the invention may be more readily understood, and so that further features thereof may be appreciated, the invention will now be described, by way of example, with reference to the accompanying drawings in which:

BRIEF DESCRIPTION OF THE DRAWINGS

FIG. 2 is a diagrammatic view of part of an inflatable curtain in accordance with the invention, FIG. 3 is a sectional view taken on the line III—III of FIG. 2, FIG. 4 is a part-sectional side view of part of an alternative embodiment of the invention, FIG. 5 is a perspective view of the arrangement shown in FIG. 4.

DETAILED DESCRIPTION OF THE INVENTION

Figure 1:
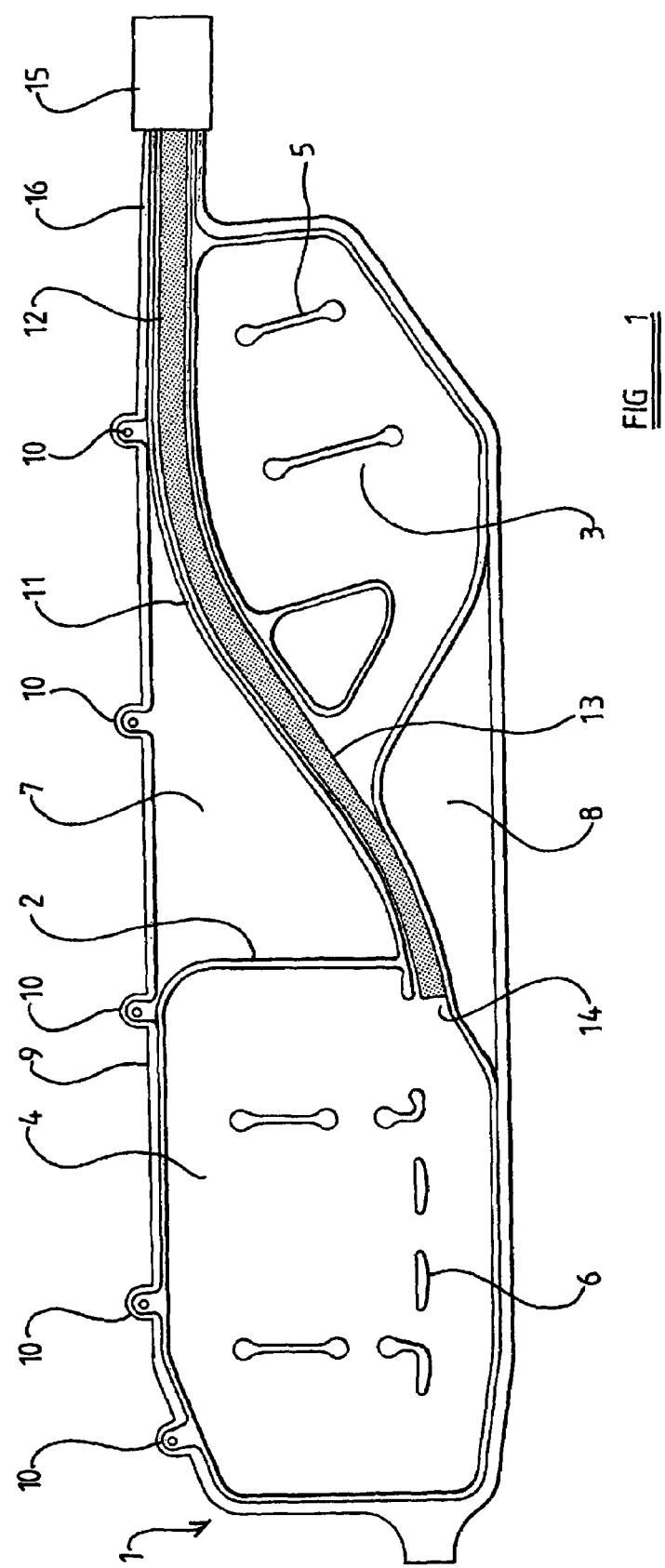
FIG. 1 is a diagrammatic view of one example of an inflatable curtain.
Figure 6:
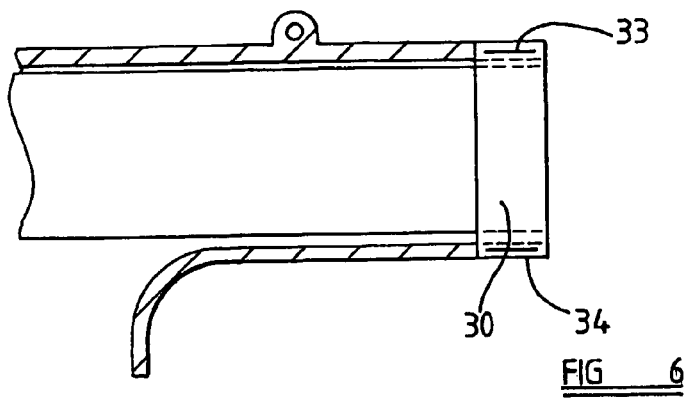
FIG. 6 is a view corresponding to FIG. 4 showing the embodiment in a final condition.

Referring initially to FIG. 1 of the accompanying drawings, an air-bag 1 in the form of an inflatable curtain is formed from two superimposed regions of fabric. An inflatable part of the inflatable curtain is defined by a peripheral seam 2 which surrounds and defines two primary inflatable zones 3, 4. Each of these inflatable zones is divided into a series of cells by further seams 5, 6. Parts of the two layers of fabric are secured together, or even woven together if a one-piece weaving technique is utilised, to provide uninflatable regions 7, 8.

The upper edge 9 of the inflatable element is provided with a plurality of fixing lugs 10 by means of which the inflatable curtain may be mounted in position within the roof of a vehicle.

A primary or main gas flow duct 11 is defined by the above-mentioned seams, and inserted within the primary gas flow duct is an inner gas flow duct in the form of an inner sleeve 12. The inner gas flow duct 12 may be provided with a region having a plurality of small openings or a porous region 13 adapted to communicate with the inflated zone 3. Inner gas flow duct 12 is shown having an open end 14 communicating with the inflated zone 4.

A gas generator 15 is provided which is connected to an extending region 16 of the inflatable curtain which contains an end part of the main gas flow duct 11, and an end part of the inner gas flow duct 12.

Referring to FIGS. 2 and 3 of the accompanying drawings the extending region 16 of an inflatable curtain in accordance with the invention is illustrated. The precise design of the rest of the inflatable curtain is not of relevance to the present invention but may be as shown in FIG. 1. The protruding portion 16 constitutes the end of the main gas flow duct 11 and, contained within the main gas flow duct 11 is the terminal part of the inner gas flow duct 12. The outer gas flow duct 11 is shown as being formed from a single layer of fabric folded at its lower edge, to have two superimposed regions which are interconnected by a seam 20 at the upper edge. The inner gas flow duct 12 is of the same configuration having an upper seam 21. In an alternative embodiment the inner gas flow duct could be made from a seamless extrusion, or a seamless woven sleeve.

It can be seen that the inner gas flow duct 12 is snugly received within the outer gas flow duct 11. The fabric forming the inner gas flow duct 12 is secured, such as by stitching, to the fabric forming the outer gas flow duct 11, in the region of the open end of the outer gas flow duct 11. In the described embodiment, the stitching is present in two discrete areas 22, 23. The first area of stitching 22 is provided at the front of the extending region 16, as shown in FIG. 2, and thus the front layer of fabric of the outer gas flow duct 11 and the front layer of fabric of the inner gas flow duct 12 are secured together towards the lower part of the extending region 16. The second area of stitching 23 is effected between the rear layers of fabric, and thus in the area 23 the rear layer of fabric of the outer gas flow duct 11 is secured to the rear layer of fabric of the inner gas flow duct 12 in the upper part of the extending region 16. The areas of stitching 22 and 23 are offset and not superimposed.

Because the fabric of the inner gas flow duct 12 is secured to the fabric of the outer gas flow duct 11, at the end of the outer gas flow duct, where the outer gas flow duct is to be connected to the gas generator 15 there is only a very minimal risk that an injector associated with a gas generator will be inserted in the inter-space between the inner gas flow duct and the outer gas flow duct. The only space available to receive the injector will be interior of the inner gas flow duct 12.

Figure 7:
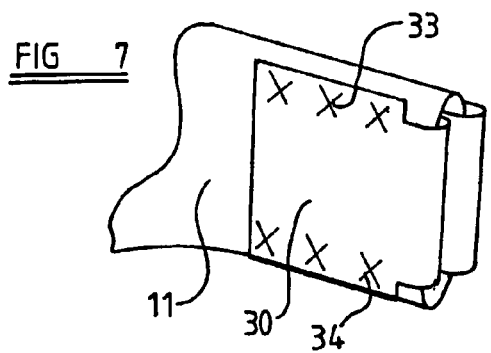
FIG. 7 is a perspective view corresponding to FIG. 6.

Turning now to FIGS. 4 to 7, in a second embodiment of the invention the inner gas flow duct 12 initially extends beyond the end of the outer gas flow duct 11, and the inner gas flow duct 12 terminates with two ears 30, 31, each of the ears having an overall height greater than the height of the inner gas flow duct 12. The ears 30, 31 may be folded back, as shown in FIG. 7, to lie adjacent the exterior of the outer gas flow duct 12, and two lines of stitching 33, 34 may be provided aligned with the upper edge and the lower edge of each of the co-aligned ears. The stitching will pass through the aligned ears 30, 31, and also through the peripheral part of the extending region 16 forming the outer gas flow duct 11. Because the ears 30, 31 each have a height greater than the height of the inner gas flow duct 12 the stitching, being adjacent the free edges of the ears, will not actually penetrate the inner gas flow duct 12.

Because the ears 30, 31 are secured to the outer part of the extending region 16 which constitutes the end of the outer flow duct 11, the risk of any injector associated with a gas generator being inserted into a space between the inner flow duct 12 and the outer flow duct 11, is minimised or obviated.

Figure 8:
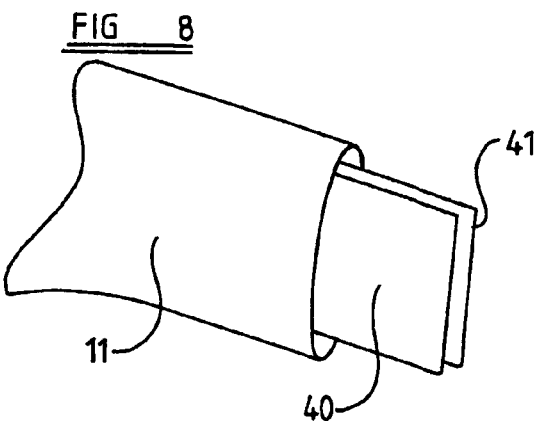
FIG. 8 is a perspective view of part of a further embodiment of the invention.
Figure 9:
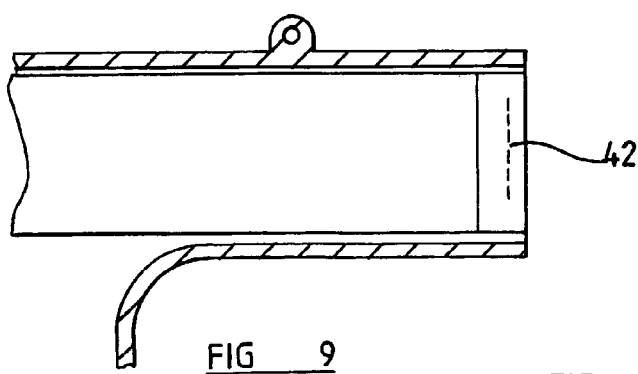
FIG. 9 is a diagrammatic view of the embodiment of FIG. 8 when in an alternate condition.
Figure 10:
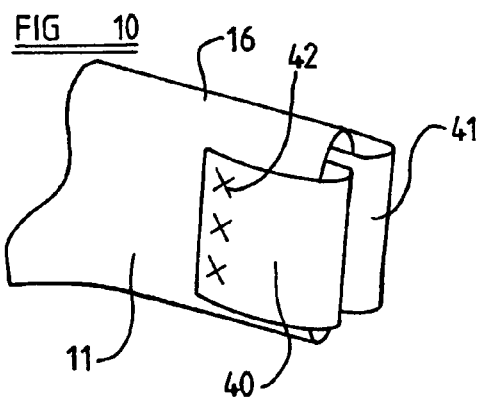
FIG. 10 is a perspective view of the embodiment as shown in FIG. 9.

FIGS. 8 to 10 illustrate a third embodiment of the invention which is generally similar to that of FIGS. 4 to 7, save that the ears are of lesser height. Thus, in the embodiment as shown in FIG. 8, the part of the inner gas flow duct 12 projecting from the outer gas flow duct 11, is in the form of two ears 40, 41, with each ear being of the size equal to the diameter, when flat, of the inner gas flow duct. As in the embodiment described above, the ears 40, 41 initially project beyond the end of the outer gas flow duct 11 and, as shown in FIGS. 9 and 10, are subsequently folded back to lie adjacent the opposed sides of the extending region 16, thus lying adjacent the outer sides of the outer gas flow duct 11. Each ear is individually secured, by a separate line of stitching (or by some other appropriate means) to the layer of fabric forming the end part of the outer gas flow duct with which the ear is in contact. Thus, as can be seen in FIG. 10, the ear 40 has been folded back to lie adjacent the front surface (as shown in FIG. 10) of the outer gas flow duct 11, and has been secured to the front layer of fabric forming the outer gas flow duct 11 by stitching 42. Similarly, the ear 41 has been folded back to lie adjacent the rear-most layer of fabric of the outer gas flow duct 11, and has been secured to that rear-most layer of fabric by stitching which is not visible in FIG. 10.

Thus, again, the fabric of the inner gas flow duct has been secured to the fabric of the outer gas flow duct, at the end of the outer gas flow duct minimising the risk of any injector being inappropriately positioned or located.

Figure 12:
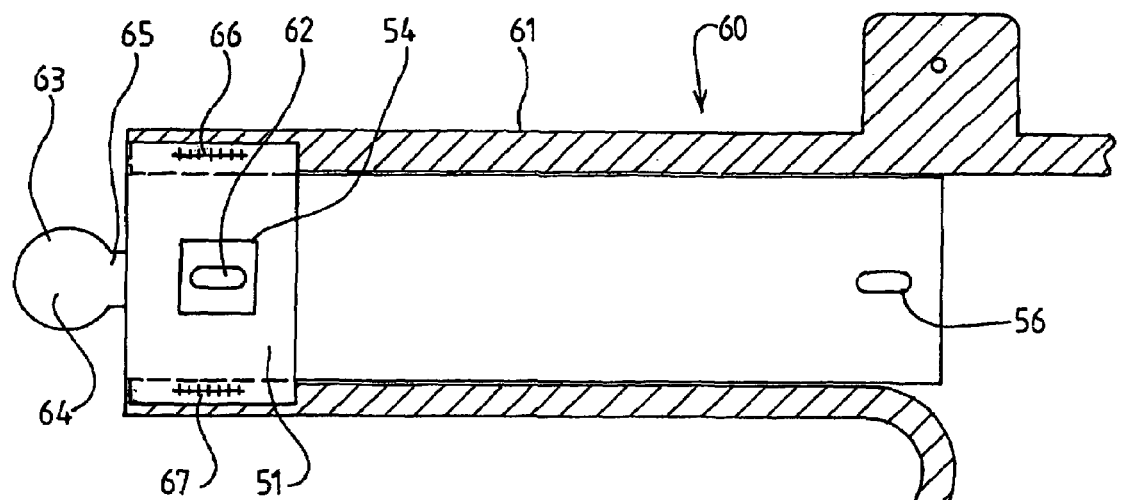
FIG. 12 is a view showing the inner gas duct of FIG. 11 mounted in an air-bag.
Figure 11:
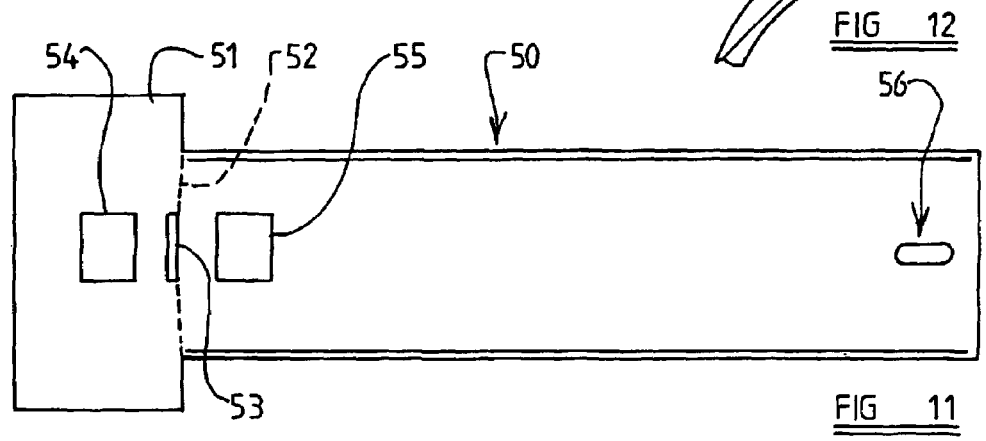
FIG. 11 is a view showing an inner gas duct on a further modified embodiment of the invention.

FIGS. 11 and 12 illustrate another embodiment of the invention which is, in certain respects, similar to that of FIGS. 4 to 7.

In the embodiment of FIG. 11 an inner gas flow duct 50 is provided, the inner gas flow duct being dimensioned to extend beyond the end of the gas flow duct and terminating in two ears, only one of which, 51, is visible in FIG. 11. The ears each have a height greater than the height of the inner gas flow duct 50. Each ear may be folded back, about a fold-line, only one of which, 52, is illustrated, to lie adjacent the exterior of the outer gas flow duct, as will be described later.

Provided in the central part of the fold-line 52 is a slot 53. The purpose of the slot will be described hereinafter.

Formed in the central part of the ear 51 is a square aperture 54. A similar aperture 55 is provided in the wall of the inner gas flow duct 50. The apertures 54 and 55 are equi-spaced on either side of the fold-line 52.

It is to be understood that each of the two ears is provided with a slot in the fold-line securing the ear to the rest of the inner gas flow duct 50, and each ear is provided with an aperture therein, and the side-wall of the gas flow duct is provided with two apertures, one to co-operate with each ear.

At least one further aperture 56 is provided in the gas flow duct at a position spaced axially from the ears.

The inner gas flow duct 50 is to be used with an inflatable element 60, part of which defines a main or outer gas flow duct 61, as shown in FIG. 12. The terminal part of the main or outer gas flow duct 61 is provided with apertures 62, and also the end of the gas flow duct is provided with two protruding tabs 63, each tab having an enlarged head portion 64 connected to the rest of the air-bag by means of a relatively narrow neck 65.

The inner gas flow duct 50 is inserted into the outer gas flow duct 61. As the inner gas flow duct 50 is inserted into position, the tabs 63 provided on the end part of the outer gas flow duct 61 are passed through the slots 53 formed in the fold-lines 52 between the ears 51 and the main part of the inner gas flow duct 50. The ears, such as the ear 51, are then folded-back to lie adjacent the exterior of the outer or main gas flow duct 61. Because the tabs 63 pass through the slots 53, the inner gas flow duct is not over-inserted into the outer or main gas flow duct 61.

The ears, such as the ear 51, are folded-back, such as by folding about the fold-line 52, so that the ears lie adjacent the exterior of the outer or main gas flow duct 61. Two lines of stitching 66, 67 are provided aligned with the upper edge and lower edge of each of the co-aligned ears. The stitching will pass through the co-aligned ears and also through the peripheral part of the outer or main gas flow duct 61. Because the ears have a height greater than the height of the inner gas flow duct 50, and because the stitching is adjacent the free edges of the ears, the stitching will not actually penetrate the inner gas flow duct 50.

It is to be appreciated that when the ears are folded-back, the apertures that have been described above are co-aligned. Thus, in the case of ear 51, the aperture 54 provided in the ear is co-aligned with the aperture 62 formed in the side-wall of the outer or main gas flow duct 61, and is also co-aligned with the aperture 55 provided in the inner gas flow duct. It is thus possible to insert a hook through the co-aligned apertures during the assembly procedure, the hook may be engaged with the further aperture 56 (or if two such further apertures are provided, with both of the apertures) in order to ensure that the inner gas flow duct 50 is appropriately positioned. This may be desirable during the assembly procedure and/or during a subsequent folding procedure. The aligned apertures could also be used for checking that the inner gas flow duct has been correctly inserted in position, for example to permit the insertion of an endoscope, or similar device, into the air-bag. It is to be appreciated that the co-aligned apertures are covered by the gas generator or the gas generator housing when the gas generator has been mounted in position. Thus, during inflation of the air-bag, no leakage will occur through the co-aligned apertures.

Figure 13:
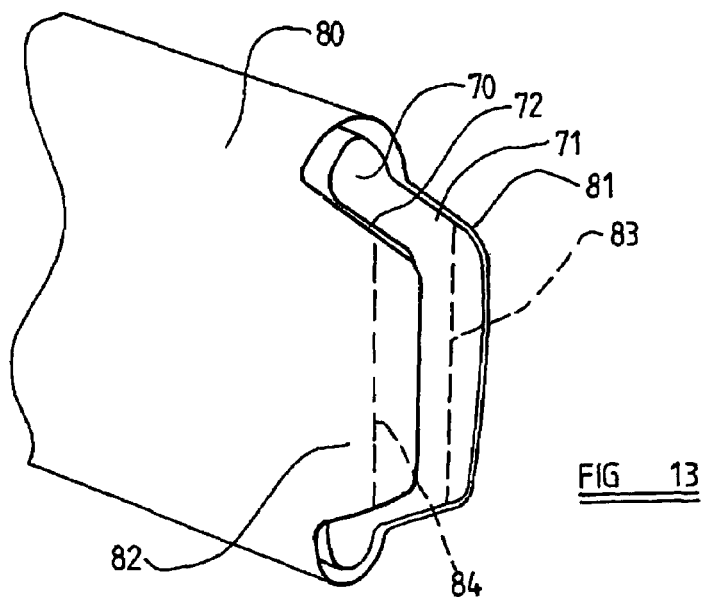
FIG. 13 is a perspective view of part of yet another embodiment of the invention.

FIG. 13 illustrates a further embodiment of the invention. In this embodiment of the invention, an inner gas flow duct 70 is provided. At the end of the inner gas flow duct there are two axially extending tabs 71, 72, which each extend axially beyond the end of the inner gas flow duct 70. The tabs are of identical size and shape and are on opposed sides of the inner gas flow duct 70.

As in the case of the embodiments described above, the inner gas flow duct 70 is to be inserted into a main or outer gas flow duct 80 which forms part of an air-bag which may be in the form of an inflatable curtain. The outer gas flow duct 80 is provided at its end with two axially extending identical tabs 81, 82. The tabs 81, 82 are located on opposed sides of the main or outer gas flow duct 80.

When the inner gas flow duct 70 is positioned within the main or outer gas flow duct 80, the tabs 71, 72 on opposite sides of the inner gas flow duct 70 are co-aligned with the adjacent tabs 81, 82 of the main or outer gas flow duct 80. A first line of stitching 83 interconnects the tabs 71 and 81, and a second line of stitching 84 interconnects the tabs 72, 82. The interconnected tabs may be folded outwardly as the gas generator is connected to the air-bag. The presence of the tabs facilitates the stitching process.

While the above description constitutes the preferred embodiment of the present invention, it will be appreciated that the invention is susceptible to modification, variation and change without departing from the proper scope and fair meaning of the accompanying claims.

The invention claimed is:

1. An air-bag for use in connection with a gas generator, the air-bag comprising an outer gas flow duct leading from the gas generator to one or more zones within the air-bag to be inflated, a separate inner gas flow duct being mounted within the outer gas flow duct, the inner gas flow duct and the outer gas flow duct having areas thereof secured together in a region to be connected to the gas generator, the inner gas flow duct being provided with projecting ears which extend beyond an end of the outer gas flow duct, and the ears being folded back about a fold-line to lie adjacent the end of the outer gas flow duct and being secured to the fabric forming the outer gas flow duct.

2. An air-bag according to claim 1 wherein at least one of the ears has a dimension which is no greater than the diameter, when flat, of the inner gas flow duct, at least one of the ears being folded back adjacent to a respective layer of fabric forming the outer gas flow duct, and at least one of the ears being secured to the adjacent layer of fabric.

3. An air-bag according to claim 1 wherein at least one of the ears has a dimension greater than the diameter of the inner gas flow duct when flat, at least one of the ears being folded back to lie adjacent the exterior of the outer gas flow duct with parts of the ears not lying over the inner gas flow duct, the parts of the ears not lying over the inner gas flow duct being secured together and being secured to the fabric forming the outer gas flow duct.

4. An air-bag according to claim 1 wherein the fold-line of a projecting ear is provided with a slot and the air-bag is provided with a tab located to pass through the slot.

5. An air-bag according to claim 1 wherein at least one ear is provided with an ear aperture, and the outer gas flow duct and the inner gas flow duct are also provided with duct apertures so that the ear aperture is aligned with the duct apertures.

6. An air-bag according to claim 5 wherein the inner gas flow duct is provided with at least one further duct aperture at a point spaced from the projecting ears.

7. An air-bag for use in connection with a gas generator, the air-bag comprising an outer gas flow duct leading from the gas generator to one or more zones within the air-bag to be inflated, a separate inner gas flow duct being mounted within the outer gas flow duct, the inner gas flow duct having first and second areas secured to two respective first and second areas of the outer gas flow duct in a region to be connected to the gas generator, the first and second areas of the inner gas flow duct being on axially extending tabs which project axially beyond the end of the outer gas flow duct.

* * * * *